May 14, 1935.
R. CROSS
Re. 19,568
PROCESS FOR TREATING PETROLEUM HYDROCARBONS
Original Filed Aug. 2, 1924
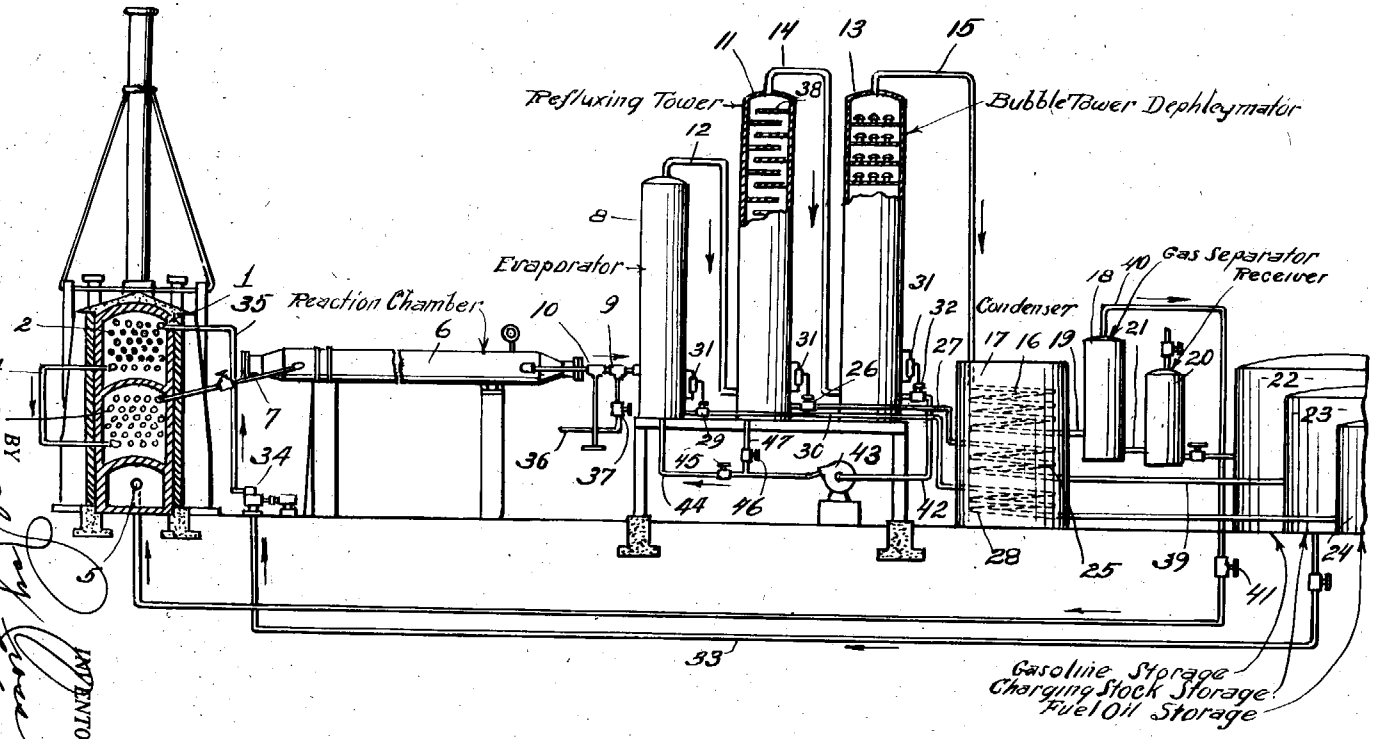
INVENTOR.
Witness:
R. E. Hamilton
BY
Roy Cross
Thomas E. Sexfield
ATTORNEY.

Reissued May 14, 1935 Re. 19,568

UNITED STATES PATENT OFFICE 19,568

PROCESS FOR TREATING PETROLEUM HYDROCARBONS

Roy Cross, Kansas City, Mo., assignor, by mesne assignments, to Gasoline Products Company, Inc., Wilmington, Del., a corporation of Delaware Original No. 1,775,067, dated September 2, 1930, Serial No. 729,693, August 2, 1924. Application for reissue August 31, 1932, Serial No. 631,293

2 Claims. (Cl. 196—48)

This invention relates to improvements in a process and apparatus for treating petroleum hydrocarbons and refers more particularly to a continuous method of cracking hydrocarbons to yield relatively light distillate having the characteristics of gasoline and the like—the cracking reaction taking place under relatively high pressure and while the oil is maintained substantially in the liquid phase.

Among the salient objects of the invention are, to provide a process in which petroleum hydrocarbons are continuously treated in a system under relatively high pressure whereby a synthetic crude is formed in which are contained considerably more of the low boiling point or lighter fractions than in the original charging stock; to provide a process in which this synthetic crude while at high temperature is released from the zone of high pressure whereby the lighter fractions are distilled off; to provide a process in which these lighter fractions are subsequently subjected to reflux condensation and a process in which the liquid material separated out during the refluxing or dephlegmating of the vapors is returned to either the evaporating stage or the initial stage of reflux condensation in order to extract the gasoline fractions out of the residue or bottoms separated in the final stage of dephlegmation; to provide a process in which an increased yield of gasoline distillate is procured and one in which there is an increased saving of heat primarily due to the method of conversion and the recycling of the products for redistillation, and, in general, to provide an apparatus for carrying out the process hereinafter described.

In the drawing, the single figure is a diagrammatic side elevational view of the apparatus with parts in section and parts broken away.

Referring to the drawing, at 1 is shown a furnace having an upper and lower compartment,—the upper compartment containing the preheating tubes 2 and the lower compartment the bank of heating tubes 3 which are connected by transfer line 4. The furnace is preferably heated by means of a gas burner diagrammatically shown at 5. The element 6 is a reaction chamber connected by a transfer line 7 to the discharge end of the heating coil and with the evaporator 8 by means of the transfer line 9 in which is interposed the reduction valve 10. The element 11 is a baffle type of dephlegmating or refluxing tower connected to the evaporator by means of a vapor line 12 and with the bubble tower 13 by a vapor line 14. The top of the bubble tower communicates through a line 15 to the condenser coil 16 positioned in the condenser box 17. At 18 is shown a gas separator connected with the discharge end of the condenser coil 16 by means of a valve 19 and with the receiver 20 through the pipe 21. 22, 23 and 24 are storage tanks for gasoline distillate, recharging stock and fuel oil respectively. At 25 is shown a cooling coil for reducing the temperature of the bottoms withdrawn from the lower part of the tower 11 through the automatically operated valve 26 and line 27. The element 28 is a cooling coil through which is circulated the fuel oil bottoms or residual hydrocarbons withdrawn automatically from the lower part of the evaporator 8 through the valve 29 and line 30. At 31, on the side of each of the towers, is diagrammatically shown a liquid level regulating device for controlling the level in the respective towers by automatic manipulation of the valves 26, 29 and 32.

Referring now to the operation, the oil to be treated is charged from the tank 23 to which it is introduced from any convenient source. This charging stock may consist of hydrocarbons such as those commercially known as kerosene, gas oil or fuel oil, or any type of hydrocarbons utilized in a cracking system for the production of gasoline distillate. This oil is withdrawn from the tank 23 through the line 33 and is charged, by means of the pump 34, through the line 35, preheating tubes 2 and heating tubes 3, successively.

The oil, after passing through the heating tubes where it is subjected to cracking temperatures, is passed continuously through the line 7 into the reaction chamber where it is permitted to collect in a considerable body and remain for a sufficient period of time for the cracking reaction, which is initiated in the coil, to be completed. The heating of the oil in the coils is so controlled that while the oil is heated to a cracking temperature, no substantial conversion is permitted to take place,—thus eliminating the deposition of free carbon in the coils and concentrating carbon deposition in the reaction chamber. The reaction chamber is preferably of forged steel construction in order to withstand the high pressures to which it is subjected. As previously stated, the temperature and pressure conditions are so regulated to cause the cracking to take place substantially in the liquid phase in the reaction chamber. Thus the hydrocarbons, on being withdrawn from the chamber, are in the form of a liquid synthetic crude having an increased percentage of low boiling point or lighter fractions relative to the charging stock. This synthetic liquid is passed through the transfer line 9, pressure being reduced at the valve 10 or upon its introduction into the evaporator 8. Under certain conditions it may be advantageous to introduce steam, or a liquid medium either cooler or at a higher temperature than the oil, through the line 36 controlled by a valve 37. Such conditions are present where an excessive amount of oil is distilled off with the reduction of pressure, leaving only a dry coke which is difficult to remove from the evaporating tower. Under such conditions, the introduction of a cooler hydrocarbon, or cooler medium, serves to reduce the temperature of the oil and increase the liquid residual material formed in the evaporator. The introduction of steam, at this point, assists and promotes vaporization of the synthetic product and improves the character of the final distillate.

The vapors distilled off in the evaporating tower pass overhead through the line 12 and are introduced into the bottom of the reflux or dephlegmating tower 11 in which may be positioned baffle elements, such as those shown at 38, or inert packing material, such as Raschig rings or the like. In this tower are separated out the higher boiling point fractions which are drawn off as previously explained through the line 27, cooling coil 25 and connecting line 39 which conducts them to the recharging stock tank 23 where they are recycled with the incoming fresh charging stock back to the cracking system.

The uncondensed fractions, passing out of the top of the column 11, are introduced by means of the line 14 into the bottom of the bubble tower 13 where a further separation is effected due to the contacting of these vapors with the separate pools of oil maintained at intervals in the column and through which they are caused to percolate. The liquid condensed from the vapors is drained back in an opposed direction to their travel and is collected in the bottom of the tower. The still uncondensed material passes off through the line 15 and is subjected to a condensing action in the coil 16 whereafter it is passed through the gas separator 18, liquid receiving tank 20 and finally into the gasoline storage tank 22. The gas separated from the liquid at 18 is returned through the line 40 controlled by a valve 41 and is utilized as fuel in the burners 5 in the furnace 1.

The method of operation, to this point, is substantially the same as the process described in certain prior applications with the possible exception that an additional dephlegmating tower is interposed between the bubble tower and the evaporating tower. The present invention differs from the prior applications, and principally application Serial No. 701,283, filed March 24th, 1924, in the name of Walter M. Cross, in that the liquid bottoms separated out in the dephlegmating tower 13 in place of being returned directly to the cracking system through the charging line for treatment in the heating tubes, is recycled when drawn off through the valve 32 and pipe 42 to a return pump 43 by means of which this reflux condensate may be directed to the evaporating tower through the pipe 44 controlled by a valve 45 or by manipulation of the valve 45 and the valve 46 diverted into the tower 11 through the line 47. By returning the reflux material knocked back in the bubble tower to the evaporator or to the first stage of dephlegmation, it is possible to reboil or redistill these relatively lighter fractions without the necessity of recirculation through the heating system. It is a well known fact that the products separated out in this final stage, or bubble tower 13, are relatively close in their boiling point characteristics to the gasoline distillate finally recovered and require very little additional heat for redistillation. Thus the recirculation through the two preceding stages or through either stage, furnishes a means for retreating these fractions without the necessity of intermingling them with oils of a radically different character, such as the first charging stock or recharging stock withdrawn from the initial tower 11. This method of treatment gives not only increased yields, but improves the character of the distillate in that the boiling point range is considerably reduced.

A further advantage of returning this material to the evaporating tower, is that it assists to prevent coking of the fuel oil or residual material in the evaporating tower.

A typical operation on mid-continent gas oil of from 30° to 32° Bé. gravity, yielded in excess of forty percent (40%) distillate,—temperatures from 700° to 850° F. being maintained in the reaction chamber and pressures in excess of 30 atmospheres. The temperatures in the evaporating tower range from 650° to 725° F.; the temperature in the initial tower 11 approximately 600° F., while the temperature in the lower part of the bubble tower was in the neighborhood of 450° F. Thus, it is obvious that the condensate from the bubble tower could be readily retreated in either of the preceding stages.

I claim:

1. A process for treating petroleum hydrocarbon oils comprising heating the oil to a cracking temperature in a heating stage without any substantial vaporization thereof and before any substantial decomposition occurs, passing the heated oil to a digestion stage where the cracking initiated in the heating stage is substantially consummated and wherein the oil is maintained substantially in liquid phase, reducing the pressure and distilling off the lighter fractions in an evaporating stage, subjecting the vaporized products to a dephlegmating action in separate successive stages and to a final condensing action, optionally recycling the reflux condensate from the final dephlegmating stage to the condensate in the bottom of the preceding dephlegmating stage to distill off the remaining lighter fractions or recycling the reflux condensate from the final dephlegmating stage to the unvaporized oil in the bottom of the evaporating stage to assist in preventing coking of the unvaporized oil, and recycling reflux condensate remaining unvaporized in the initial dephlegmating stage through the system.

2. In a process for converting higher boiling hydrocarbons into lower boiling hydrocarbons suitable for motor fuel wherein said higher boiling hydrocarbons are subjected to conversion temperature while maintained at relatively high superatmospheric pressure in a conversion zone for a period sufficient to effect the desired conversion thereof and the converted products while at elevated temperature are passed to a vaporizing zone maintained under pressure sufficiently lower than that maintained in said conversion zone to normally cause substantially all the converted products to separate into vapors and a dry coke difficult to remove; the improvement which comprises fractionally condensing vapors liberated in said vaporizing zone, separately collecting a heavy condensate fraction, an intermediate condensate fraction, and a light final condensate fraction, and introducing intermediate condensate so obtained into said vaporizing zone in an amount sufficient to prevent vaporization of the heavy liquid constituents of said converted products and produce a liquid residue suitable for fuel oil, withdrawing said fuel oil from said vaporizing zone at a substantially constant rate sufficient to prevent the accumulation of large quantities of fuel oil therein, and returning said heavy condensate to said conversion zone.

ROY CROSS.